United States Patent
Boggia et al.

(10) Patent No.: US 10,367,875 B2
(45) Date of Patent: Jul. 30, 2019

(54) METHOD AND SYSTEM FOR DYNAMIC RATE ADAPTATION OF A STREAM OF MULTIMEDIA CONTENTS IN A WIRELESS COMMUNICATION NETWORK

(71) Applicant: Telecom Italia S.p.A., Milan (IT)

(72) Inventors: Gennaro Boggia, Bari (IT); Pietro Camarda, Bari (IT); Marco Caretti, Turin (IT); Roberto Fantini, Turin (IT); Luigi Alfredo Grieco, Bari (IT); Bruno Melis, Turin (IT); Giuseppe Piro, Bari (IT)

(73) Assignee: Telecom Italia S.p.A., Milan (IT)

( * ) Notice: Subject to any disclaimer, the term of this patent is extended or adjusted under 35 U.S.C. 154(b) by 43 days.

(21) Appl. No.: 15/538,707

(22) PCT Filed: Dec. 23, 2014

(86) PCT No.: PCT/EP2014/079164
§ 371 (c)(1),
(2) Date: Jun. 22, 2017

(87) PCT Pub. No.: WO2016/102001
PCT Pub. Date: Jun. 30, 2016

(65) Prior Publication Data
US 2018/0020035 A1 Jan. 18, 2018

(51) Int. Cl.
*G06F 13/00* (2006.01)
*H04L 29/06* (2006.01)
(Continued)

(52) U.S. Cl.
CPC ........ *H04L 65/607* (2013.01); *H04L 43/0882* (2013.01); *H04L 65/4069* (2013.01);
(Continued)

(58) Field of Classification Search
CPC . H04L 65/4084; H04L 65/4092; H04L 65/80; H04L 43/0882; H04L 65/604;
(Continued)

(56) References Cited

U.S. PATENT DOCUMENTS 8,867,390 B2 * 10/2014 Chen ............... H04L 1/0002
370/252
9,369,513 B2 * 6/2016 Zhao ............... H04L 65/608
(Continued)

FOREIGN PATENT DOCUMENTS

| WO | 2012059897 A1 | 5/2012 |
|---|---|---|
| WO | 2013002828 A2 | 1/2013 |
| WO | 2013072080 A1 | 5/2013 |

OTHER PUBLICATIONS

Xiaoling Qiu et al, "Optimizing HTTP-based Adaptive Video Streaming for wireless access networks", Broadband Network and Multimedia Technology (IC-BNMT), 2010 3rd IEEE International Conference, vol., no. pp. 838,845, Oct. 26-28, 2010.
(Continued)

*Primary Examiner* — Kenneth R Coulter
(74) *Attorney, Agent, or Firm* — Banner & Witcoff, Ltd.

(57) ABSTRACT

A method of downloading multimedia content from a server to a client through a wireless communication network is proposed. The multimedia content is subdivided into a plurality of portions and for each portion the server stores a plurality of versions thereof each of which is encoded with a specific encoding quality. The method comprises: selecting, among the plurality of versions of each portion of the multimedia content, a version of the portion of the multimedia content to be downloaded on the basis of wireless communication parameters determined at at least two different layers of a wireless communication network OSI protocol stack at the client.

20 Claims, 3 Drawing Sheets

(51) Int. Cl.
*H04L 12/26* (2006.01)
*H04L 12/24* (2006.01)

(52) U.S. Cl.
CPC ...... *H04L 65/4084* (2013.01); *H04L 65/4092* (2013.01); *H04L 65/604* (2013.01); *H04L 65/80* (2013.01); *H04L 41/509* (2013.01); *H04L 41/5025* (2013.01)

(58) Field of Classification Search
CPC . H04L 65/607; H04L 65/4069; H04L 41/509; H04L 41/5025
USPC ......... 709/231, 232, 233–235, 203, 217–219
See application file for complete search history.

(56) References Cited

U.S. PATENT DOCUMENTS

| | | | |
|---|---|---|---|
| 9,591,513 | B2* | 3/2017 | Balasubramanian .................... H04W 28/0231 |
| 2007/0064604 | A1* | 3/2007 | Chen ..................... H04L 1/0002 370/230 |
| 2012/0213114 | A1* | 8/2012 | Chen ..................... H04L 1/0002 370/252 |
| 2014/0036667 | A1 | 2/2014 | Balasubramanian et al. |
| 2014/0317241 | A1* | 10/2014 | Zhao .................... H04L 65/608 709/219 |
| 2015/0373077 | A1* | 12/2015 | Ramamurthi ......... H04W 36/14 709/219 |
| 2017/0142609 | A1* | 5/2017 | Balasubramanian .................... H04W 28/0231 |

OTHER PUBLICATIONS

Wei Pu et al., "Video adaptation proxy for wireless Dynamic Adaptive Streaming over HTTP", Packet Video Workshop (PV), 2012 19th International, vol. no. pp. 65,70, May 10-11, 2012.
T.C. Thang et al., "Adaptive video streaming over HTTP with dynamic resource estimation", J. Communications and Networks, vol. 15, No. 6, pp. 635-644, Dec. 2013.
M. Gorius et al., "Dynamic media streaming over wireless and mobile IP networks", Consumer Electronics—Berlin (ICCE-Berlin), 2012 IEEE International Conference, vol. no. pp. 158,162, Sep. 3-5, 2012.
Ramamurthi Vishwanath et al, "Link aware HTTP Adaptive Streaming for enhanced quality of experience," 2013 IEEE Global Communications Conference (GLOBECOM), IEEE, Dec. 9, 2013 (Dec. 9, 2013). pp. 1675-1680, XP032604920, DOI: 10.1109/GLOCOM. 2013.6831314, [retrieved on Jun. 11, 2014].
Sanghoon Park et al: "Network-adaptive HD MPEG-2 video streaming with cross-layered channel monitoring in WLAN" Journal of Zhejiang University Science A; An International Applied Physics & Engineering Journal, Springer, Berlin, DE, vol. 7, No. 5, May 1, 2006 (May 1, 2006), pp. 885-893, XP019385049, ISSN: 1862-1775, DOI: 10.1631/JZUS.2006.A0885.
Zhao Miao et al: "Utility-maximization framework for dynamic adaptive streaming over HTTP in multi-user MIMO LTE networks," 2014 Eleventh Annual IEEE International Conference on Sensing, Communication, and Networking (SECON), IEEE, Jun. 30, 2014 (Jun. 30, 2014), pp. 28-36, XP032708802, DOI: 10.1109/SAHCN. 2014.6990324 [retrieved on Dec. 16, 2014].
Oct. 6, 2015—(WO) ISR & Written Opinion—App PCT/EP2014/079164.

\* cited by examiner

METHOD AND SYSTEM FOR DYNAMIC RATE ADAPTATION OF A STREAM OF MULTIMEDIA CONTENTS IN A WIRELESS COMMUNICATION NETWORK

BACKGROUND OF THE INVENTION

Field of the Invention

The present invention refers to communication systems. More particularly, the present invention relates to the field of wireless or mobile telecommunication networks. Even more particularly, the present invention relates to the rate control of streams of multimedia contents for streaming services in a wireless communication network.

Overview of the Related Art

Streaming services, such as video delivery, i.e. services in which a multimedia content (e.g., a multimedia file, such as a video recording or video clip) is constantly received by and presented to an end user, while being delivered by a provider of the streaming service, are already widely popular and are expected to become dominant in current and next generation wireless communication networks, particularly in cellular systems, mainly thanks to the increment in the network available bandwidth, for example allowed by both Long Term Evolution (LTE) and Long Term Evolution Advance (LTE-A) standards for mobile telephony networks.

Unfortunately, even in large-bandwidth (i.e., broadband) wireless communication networks (such as LTE/LTE-A networks), it could be difficult to offer a satisfactory Quality of Service (QoS) level during the provision of the streaming service without adopting ad hoc optimization strategies.

Indeed, in any wireless communication network, a user may experience a fluctuation in time of the available bandwidth, which may be due to the variation of both the channel quality and the traffic load. Such a fluctuation may significantly influence the quality of the offered service, especially for streaming services, thus causing interruption or lagging in the provision of the multimedia content.

In the art, in order to cope with this issue, the concept of scalable multimedia content (e.g. scalable video) has been conceived for adapting the multimedia content to a variable available transmission rate. For example, in the case of a video multimedia content, the quality of a video stream may be adapted according to the amount of bandwidth available for a given user wishing to enjoy the video. This approach has been highly exploited in several solutions based on the video compression format H.264/MPEG-4 Part 10 or Advanced Video Coding (AVC) with the Scalable Video Coding (SVC) extension, Fine Grained Scalability (FGS), hierarchical, and Multiple Description Coding (MDC) encoding schemes.

More recently the Dynamic Adaptive Streaming over HTTP (DASH) standard, also known as MPEG-DASH, has been developed. The MPEG-DASH standard defines a client-server architecture configured for delivering scalable (mainly video) multimedia contents through HTTP (Hyper Text Transfer Protocol). According to the MPEG-DASH standard, each multimedia content is divided in chunks of fixed or variable (i.e., different from chunk to chunk) length. Each multimedia content chunk is associated with a plurality of multimedia content segments available within the remote server, which is configured to provide the streaming services (e.g., a server of a provider of streaming services). Each segment associated with a same multimedia content chunk comprises the same portion of the multimedia content, but each of the multimedia content segments is a version of the multimedia content portion encoded with a specific encoding rate, e.g. a specific frame rate in the case of a video (therefore, the multimedia content segments associated with the same multimedia content chunk have a different size, expressed in number of bits, one from the other). For a given multimedia content, a list of its chunks, associated multimedia content segments and their storage location inside the server (e.g., expressed through a plurality of Universal Resource Locators—URLs), encoding rates, and other parameters associated with the multimedia content are organized according to a so-called Media Presentation Description (MPD) file stored in the server.

In order to access the streaming service and receive a (desired) multimedia content, the end user (to be intended by means of a user equipment such as a personal computer, a smartphone, a tablet and the like) has to obtain the MPD file first. The MPD file can be delivered by the server to the end user via HTTP, email, or by similar data transmission mechanisms. Once the end user has obtained the MPD file, the user can send to the server a request for receiving segments (of different chunks) of the multimedia content. Moreover, during the reception of the multimedia content, the user can estimate the available transmission bandwidth and request to the server the most suitable (in terms of number of bits) segments of each chunk listed within the MPD.

However, the MPEG-DASH standard does not provide any specific guideline to design and implement a rate control algorithm adapted to be implemented at the end user side.

In the art, some solutions addressing the aforementioned problems have been proposed. Most of such solutions focus on wired network architectures and propose schemes that are not suitable for wireless networks. Other solutions, which are mainly dedicated to wireless communication networks and cellular network architectures, propose very simple strategies that adjust the encoding rate of video segments by considering one specific measurement conducted at a given point of the OSI (Open Systems Interconnection) protocol stack (i.e., at the physical layer or at the application layer).

For example, Xiaoling Qiu; Haiping Liu; Deshi Li; Song Zhang; Ghosal, D.; Mukherjee, B., "Optimizing HTTP-based Adaptive Video Streaming for wireless access networks", Broadband Network and Multimedia Technology (IC-BNMT), 2010 3rd IEEE International Conference, vol., no. pp.838, 845, 26-28 Oct. 2010 discloses an optimization algorithm to address the issue of bitrate switching in HTTP-based adaptive video streaming The optimization algorithm is based on IIS (Internet Information Services) Smooth Streaming architecture, and can be easily applied to Adobe Flash Dynamic Streaming, and Apple HTTP Adaptive Bitrate Streaming. The optimization algorithm selects the best video bitrate according to channel condition and the amount of video stream buffered in the client to provide viewers the best possible quality while reducing the number of interruptions.

Wei Pu; Zixuan Zou; Chang Wen Chen, "Video adaptation proxy for wireless Dynamic Adaptive Streaming over HTTP", Packet Video Workshop (PV), 2012 19th International, vol. no. pp. 65, 70, 10-11 May 2012, discloses a wireless DASH (WiDASH) proxy adapted to enhance the Quality-of-Experience (QoE) of wireless DASH. WiDASH proxy locates at the edge between Internet and wireless core networks. WiDASH proxy is in charge of video adaptation, which makes it feasible to perform global optimization over multiple concurrent DASH flows. WiDASH proxy improves DASH QoE by splitting the original TCP connection from DASH server to a wireless user into one wired TCP and multiple wireless TCPs. In addition, WiDASH proxy employs video quality aware dynamic prioritization. Low bit rate video streams are entitled with high priority to guarantee minimum QoE for users with bad wireless channel quality. Finally, WiDASH comprises a multiple-input multiple-output adaptive optimal controller, based on adaptive control theory.

Thang, T. C.; Pham, A. T.; Nguyen, H. X.; Cuong, P. L.; Jung Won Kang, "Video streaming over HTTP with dynamic resource prediction", Communications and Electronics (ICCE), 2012 Fourth International Conference, vol. no. pp. 130, 135, 1-3 Aug. 2012, discloses a general formulation for throughput estimation taking into account previous values of instant throughput and round trip time.

Gorius, M.; Yongtao Shuai; Herfet, T., "Dynamic media streaming over wireless and mobile IP networks", Consumer Electronics-Berlin (ICCE-Berlin), 2012 IEEE International Conference, vol. no. pp. 158, 162, 3-5 Sep. 2012, discloses a Predictably Reliable Real-time Transport (PRRT) protocol, a protocol layer that efficiently supports the reliability required by multimedia services under their specific time constraint. PRRT is based on hybrid error coding that allows for both proactive and reactive reliability mechanisms. Specifically, it is designed to achieve the optimal trade-off between those mechanisms under strict delay constraints in order to minimize coding overhead. Based on this transport protocol a dynamic media streaming architecture is proposed.

WO 2013/002828, discloses systems and methods for determining available bandwidth and performing initial stream selection when commencing adaptive bitrate streaming using Hypertext Transfer Protocol (HTTP) in accordance with embodiments of the invention. An embodiment includes performing a bandwidth probe to obtain an estimate of the available bandwidth between a playback device and a remote server, where the bandwidth probe comprises the playback device requesting blocks of data of increasing size from the remote server until the time taken to download a requested block exceeds a predetermined threshold, selecting an initial stream from said plurality of streams of encoded media that are encoded at different maximum bitrates using the playback device based upon the maximum bitrates of the plurality of streams and the estimated available bandwidth, and commencing streaming of encoded media by requesting portions of the encoded media from the initial streams using the playback device.

WO 2013/072080 discloses a mobile telecommunication device comprising: a receiver for receiving content data via a mobile telecommunication network; a play-out buffer for holding downloaded but yet un-played content data; a media reader for reading content data at a media rate from the play-out buffer and for sending content to a display or speaker for rendering; a segment request controller for sending media segment requests to a remote server; a buffer fill monitor for checking a fill level of the play-out buffer, continuously or at least at the end of a media segment download. The segment request controller is configured to switch between a state of continuously requesting media segments and a state of not requesting any media segments. This switching is depending on the fill level. By restricting the download of segments, more and longer idle periods are created which increase the chance that the radio state is switched down, so as to save battery and resources.

WO 2012/059897 discloses a method that comprises performing one or more checks associated with hyper text transport protocol streaming of segmented media data, the segmented media data being streamed at a current bandwidth level corresponding to current representation of the content; deciding, based on the results of the one or more checks, whether or not to switch to another representation associated with another bandwidth level different from said current bandwidth level; and upon deciding to switch to another representation, selecting a new representation with a bandwidth level different from said current bandwidth level; and requesting a next media segment from the new representation.

SUMMARY OF THE INVENTION

The Applicant has found that the known solutions mentioned above fail in identifying all the causes that involve a fluctuation of the available bandwidth in a wireless communication network and therefore fail in ensuring satisfactory performances for the streaming service under a wide range of network conditions.

Moreover, the Applicant has noticed a general lack of solutions specifically addressed to streaming services optimization in wireless communication networks of the LTE/LTE-A typology.

Therefore, the Applicant has coped with the problems of the prior art solutions and has found that by implementing a rate control algorithm exploiting a cross-layer (in terms of OSI protocol stack layers) approach it is possible to achieve highly efficient streaming services under a wide range of network conditions.

Particularly, one aspect of the present invention proposes a method of downloading a multimedia content MC from a server to a client through a wireless communication network. The multimedia content is subdivided into a plurality of portions $ck_j$ and for each portion the server storing a plurality of versions $seg_{i,j}$ thereof each of which is encoded with a specific encoding quality $br_{i,j}$. The method comprises: selecting, among the plurality of versions $seg_{i,j}$ of each portion $ck_j$ of the multimedia content MC, a version $seg_{i,j}$ of said portion $ck_j$ of the multimedia content MC to be downloaded on the basis of wireless communication parameters determined at at least two different layers of a wireless communication network OSI protocol stack at the client.

Preferred features of the present invention are set forth in the dependent claims.

In an embodiment of the present invention, each portion $ck_j$ of the multimedia content MC has a respective time duration Ts and the step of selecting a version $seg_{i,j}$ among the plurality of versions of each portion $ck_j$ of the multimedia content MC is iterated with a periodicity Tp longer than the time duration Ts of each portion $ck_j$ of the multimedia content MC.

In an embodiment of the present invention, the periodicity Tp is an integer multiple of the time duration Ts of each portion $ck_j$ of the multimedia content MC.

In an embodiment of the present invention, the step of selecting a version $seg_{i,j}$ among the plurality of versions of each portion $ck_j$ of the multimedia content MC comprises: selecting versions $seg_{i,j}$ having a same specific encoding quality $br_{i,j}$ for a number M of consecutive portions $ck_j$ of the multimedia content MC to be downloaded.

In an embodiment of the present invention, the periodicity Tp is equal to sum of the time durations Ts of the selected number M of consecutive portions $ck_j$ of the multimedia content MC.

In an embodiment of the present invention, the wireless communication parameters determined at the at least two different layers of a wireless communication network OSI protocol stack at the client comprise: first wireless communication parameters determined at an application layer of the OSI protocol stack, second wireless communication parameters determined at a level of a data link layer of the OSI protocol stack, third wireless communication parameters determined at the level of the data link layer based on measurements performed at a level of a physical layer of the OSI protocol stack.

In an embodiment of the present invention, the first wireless communication parameters comprise a streaming service quality $E_{PLR}(t_r)$ of the download of the multimedia content MC from the server to the client determined at the application layer of the OSI protocol stack; the second wireless communication parameters comprise a measured assigned bandwidth $R_{RX}(t_r)$ assigned for downloading the multimedia content MC from the server to the client by means of the wireless communication network determined at the data link layer of the OSI protocol stack, and the third wireless communication parameters comprise an allowable physical data rate for the download of the multimedia content MC from the server to the client based on a transmission channel quality determined at the data link layer of the OSI protocol stack on the basis of said measurements performed at level of physical layer of the OSI protocol stack.

In an embodiment of the present invention, each iteration of the step of selecting a version $seg_{i,j}$ among the plurality of versions of each portion $ck_j$ of the multimedia content MC comprises obtaining the wireless communication parameters at least once.

In an embodiment of the present invention, the streaming service quality $E_{PLR}(t_r)$ comprises a packet loss rate moving average $E_{PLR}(t_r)$ determined as $$E_{PLR}(t_r) = \gamma \times E_{PLR}(t_{r-1}) + (1-\gamma) \times PLR(t_r),$$

wherein $E_{PLR}(t_r)$ is a packet loss rate moving average for the current iteration, $E_{PLR}(t_{r-1})$ is a packet loss rate moving average determined at a previous iteration, $PLR(t_r)$ is a packet loss rate for current iteration and $\gamma$ is a smoothing constant used to compute the moving average of the considered parameter.

In an embodiment of the present invention, the allowable physical data rate comprises a maximum instantaneous physical data rate $dmax(t_{TTI})$ computed as:

$$d\max(t_{TTI}) = \text{efficiency} \times n\text{RE} \times 0.9 \times OH,$$

wherein $dmax(t_{TTI})$ is the maximum instantaneous physical data rate, nRE is a number n of resource elements RE dedicated to transmission of data referred to the versions of the portions of the multimedia content within a considered resource block, OH is an overhead due to the OSI protocol stack, 0.9 is a corrective factor, and efficiency is a value taken from the Table 7.2.3-1 of 3GPP TS 36.213 on the basis of a measured SINR for the considered resource block In an embodiment of the present invention, the allowable physical data rate further comprises a moving average $Dmax(t_{TTI})$ of the physical data rate computed as:

$$D\max(t_{TTI}) = \beta \times D\max(t_{TTI-1}) + (1-\beta) \times d\max(t_{TTI}),$$

wherein $Dmax(t_{TTI})$ is the moving average of the physical data rate for the current iteration, $Dmax(t_{TTI-1})$ is a moving average of the physical data rate for a previous iteration and $\beta$ is the smoothing constant used to compute the moving average of the considered parameter.

In an embodiment of the present invention, each iteration of the step of selecting a version $seg_{i,j}$ among the plurality of versions of each portion $ck_j$ of the multimedia content MC further comprises:
  a) checking whether the measured assigned bandwidth $R_{RX}(t_r)$ is lower than an allowable encoding bit rate $R_{TX}(t_r)$ selected for the versions $seg_{i,j}$ downloaded from the server by the client during the previous iteration of the step of selecting a version $seg_{i,j}$ among the plurality of versions of each portion $ck_j$ of the multimedia content MC, and
  if the measured assigned bandwidth $R_{RX}(t_r)$ is lower than the allowable encoding bit rate $R_{TX}(t_r)$:
    b) setting a next allowable encoding bit rate $R_{TX}(t_{r+1})$ for the next versions to be downloaded from the server by the client equal to the measured assigned bandwidth $R_{RX}(t_r)$ during the current iteration of the step of selecting a version $seg_{i,j}$ among the plurality of versions of each portion $ck_j$ of the multimedia content MC, or
  else, if the measured assigned bandwidth $R_{RX}(t_r)$ is greater than or equal to the allowable encoding bit rate $R_{TX}(t_r)$:
    c) verifying whether a quality of the communication between the client and the server allows the next allowable encoding bit rate $R_{TX}(t_{r+1})$ being greater than the allowable encoding bit rate $R_{TX}(t_r)$ on the basis of the streaming service quality $E_{PLR}(t_r)$ and of the allowable physical data rate, and
    in the affirmative case:
      d) increasing next allowable encoding bit rate $R_{TX}(t_r)$ with respect to the allowable encoding bit rate $R_{TX}(t_r)$, or
    in the negative case:
      e) checking whether a quality of the communication between the client and the server allows the next allowable encoding bit rate $R_{TX}(t_{r+1})$ being greater than the allowable encoding bit rate $R_{TX}(t_r)$ on the basis of the streaming service quality $E_{PLR}(t_r)$ and whether during a predetermined number Sth of previous iterations of the step of selecting a version $seg_{i,j}$ among the plurality of versions of each portion $ck_j$ of the multimedia content MC the allowable encoding bit rate $R_{TX}(t_r)$ has been set equal to the measured assigned bandwidth $R_{RX}(t_r)$, and
      in the affirmative case:
        f) increasing the next allowable encoding bit rate $R_{TX}(t_{r+1})$ to a value higher than the allowable encoding bit rate $R_{TX}(t_r)$ of the predetermined number Sth of previous iterations of the step of selecting a version $seg_{i,j}$ among the plurality of versions of each portion $ck_j$ of the multimedia content MC, or
      in the negative case:
        g) setting a next allowable encoding bit rate $R_{TX}(t_{r-1})$ for the next versions to be downloaded from the server by the client equal to the allowable encoding bit rate $R_{TX}(t_r)$ during the current iteration of the step of selecting a version $seg_{i,j}$ among the plurality of versions of each portion $ck_j$ of the multimedia content MC.

In an embodiment of the present invention, the step a) of checking whether the measured assigned bandwidth $R_{RX}(t_r)$ is lower than an allowable encoding bit rate $R_{TX}(t_r)$ comprises weighting the allowable encoding bit rate $R_{TX}(t_r)$ by a rate threshold Rth.

In an embodiment of the present invention, the step c) of verifying if the quality of the communication between the client and the server allows the next allowable encoding bit rate $R_{TX}(t_{r-1})$ being greater than the allowable encoding bit rate $RT_X(t_r)$ comprises checking whether the next allowable physical data rate of the versions $seg_{i,j}$ of the portions $ck_j$ of the multimedia content MC to be downloaded is greater than the allowable physical data rate $Dmax(t_{TTI})$ of the downloaded versions of the portions of the multimedia content MC.

In an embodiment of the present invention, the step c) of verifying if the quality of the communication between the client and the server allows the next allowable encoding bit rate $R_{TX}(t_{r+1})$ being greater than the allowable encoding bit rate $R_{TX}(t_r)$ further comprises checking whether the streaming service quality $E_{PLR}(t_r)$ is lower than a streaming service quality threshold PLRth.

In an embodiment of the present invention, the step d) of increasing the next allowable encoding bit rate $R_{TX}(t_{r+1})$ with respect to the allowable encoding bit rate $R_{TX}(t_r)$ comprises setting the next allowable encoding bit rate $R_{TX}(t_{r+1})$ to a value corresponding to the allowable encoding bit rate $R_{TX}(t_r)$ multiplied by a ratio n of the next allowable physical data rate $Dmax(t_{r+1})$ and the allowable physical data rate $Dmax(t_r)$.

In an embodiment of the present invention, the step e) of checking whether a quality of the communication between the client and the server allows the next allowable encoding bit rate $R_{TX}(t_{r+1})$ being greater than the allowable encoding bit rate $R_{TX}(t_r)$ on the basis of the streaming service quality $E_{PLR}(t_r)$ and whether during a predetermined number of previous iterations the step of selecting a version $seg_{i,j}$ among the plurality of versions of each portion $ck_j$ of the multimedia content MC the allowable encoding bit rate $R_{TX}(t_r)$ has been set equal to the measured assigned bandwidth $R_{RX}(t_r)$ comprises checking whether the streaming service quality $E_{PLR}(t_r)$ is lower than a streaming service quality threshold PLRth.

In an embodiment of the present invention, the step f) of increasing the allowable encoding bit rate $R_{TX}(t_{r+1})$ to a value higher than the measured assigned bandwidth $R_{RX}(t_r)$ of the predetermined number of previous iterations Sth comprises setting the next allowable encoding bit rate $R_{TX}(t_{r+1})$ to a value corresponding to the allowable encoding bit rate $R_{TX}(t_r)$ multiplied by a multiplicative factor m.

In an embodiment of the present invention, the step of selecting a version $seg_{i,j}$ among the plurality of versions of each portion $ck_i$ of the multimedia content MC comprises selecting versions having the lowest encoding quality among the plurality of versions of each portion of the multimedia content in a first iteration of the step of selecting a version $seg_{i,j}$ among the plurality of versions of each portion $ck_j$ of the multimedia content MC.

Another aspect of the present invention proposes a client adapted to couple with a server through a wireless communication network for downloading a multimedia content MC, the multimedia content being subdivided into a plurality of portions $ck_j$ and for each portion $ck_j$ the server storing a plurality of versions $seg_{i,j}$ thereof each of which is encoded with a specific encoding quality $br_{i,j}$, wherein the client is configured to implement the method of above.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION

Figure 1:
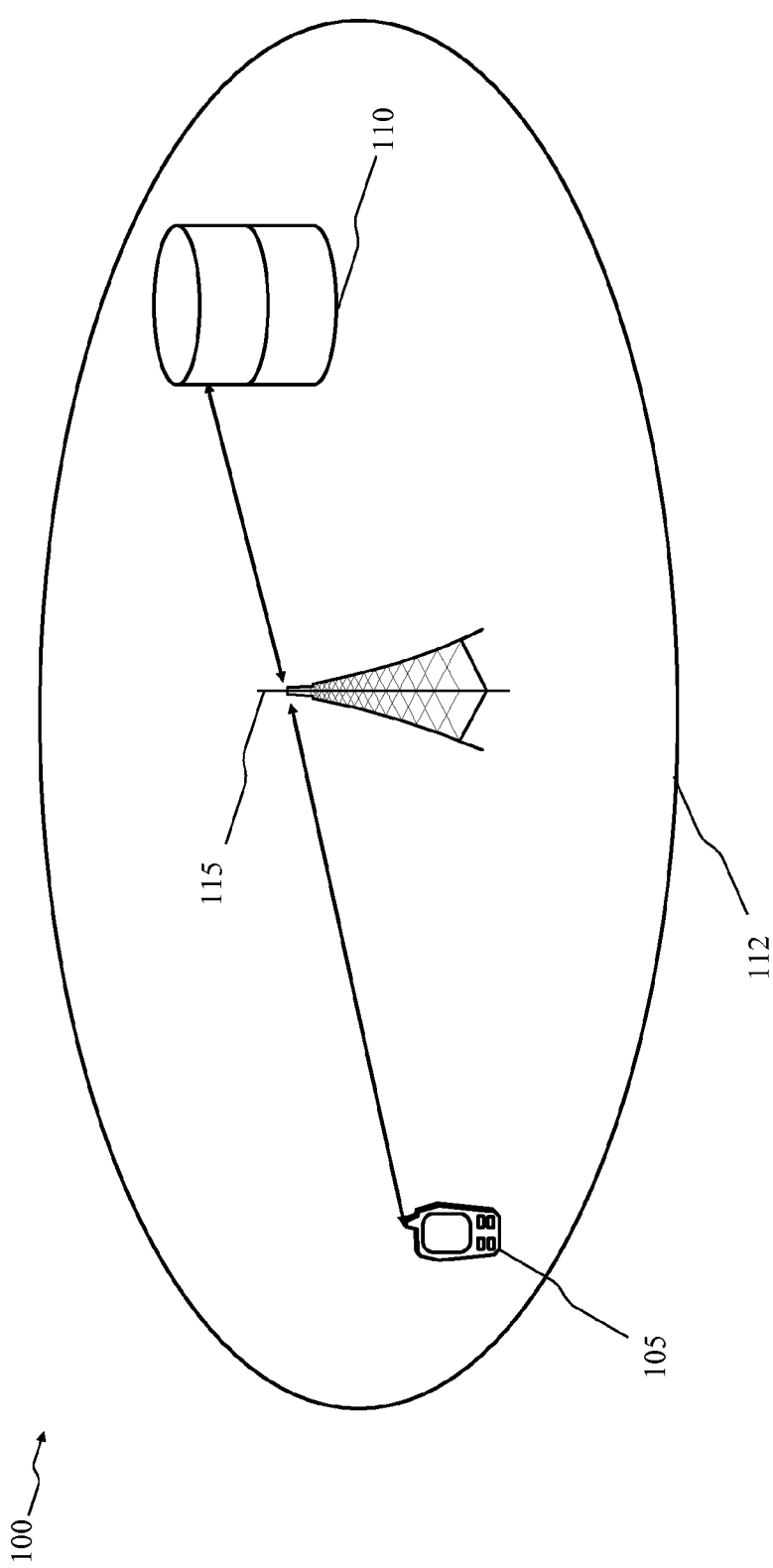
FIG. 1 is a principle schematic of a wireless communication network in which a client connects to a server for requesting a streaming service.

With reference to the drawings, FIG. 1 is a principle schematic of a (generic) wireless communication network 100 in which a client 105 (e.g. a client software application running on user equipment) connects to a server 110 for requesting a streaming service.

The wireless communication network 100 allows and manages communications of user equipments or UE (e.g., mobile telephones, smartphones, personal computers and tablets) such as a UE on which runs the client 105 over a geographical coverage area 112 by means of one or more radio communication stations, such as the radio communication station 115. For example, the wireless communication network 100 is a 3GPP Long Term Evolution (LTE)/LTE Advanced (LTE-A) mobile telephony network adapted to manage communications (i.e., transmission and/or reception of information, such as binary data packets) within the geographical coverage area 112 by means of a plurality of evolved Node B (eNB).

The server 110 is an entity that may be part of the wireless communication network 100, for example comprised in a core network portion of the wireless communication network 100, or, alternatively, connected to the wireless communication network 100, for example the server 110 is connected to the wireless communication network 100 by means of the Internet.

The server 110 is configured to provide streaming services of multimedia contents, such as video clips, television content, music, Internet radio, to one or more clients, such as the client 105 (e.g., through the radio communication station 115). In other words, the server 110 is adapted to deliver a (stored or temporarily stored) multimedia content MC (e.g., a multimedia file, such as a video record) to the client 105 in such a way that the multimedia content MC is directly enjoyable by means of the client 105 substantially from the start of the multimedia content MC delivery.

In particular, the multimedia content MC is scalable in the sense explained in the introductory part of the present description. In an embodiment of the invention, the server 110 is configured to implement the MPEG-DASH standard. As discussed in the introductory part of the present description, according to the MPEG-DASH standard the multimedia content MC is subdivided in a plurality of multimedia content chunks or, simply, chunks $ck_i$ ($1 \le i \le I$, wherein I is a positive integer) of fixed or variable (from chunk to chunk) length. Each chunk $ck_i$, is associated with a plurality of multimedia content segments or, simply, segments $seg_{i,j}$ ($1 \le j \le J$, wherein J is a positive integer) available at the server 110. Each segment $seg_{i,j}$ of a same chunk $ck_i$ comprises the same portion of the multimedia content MC but each one of the segments $seg_{i,j}$ is a version of the multimedia content MC portion (i.e., the chunk $ck_i$) which is encoded with a specific (average) encoding quality, such as for example an (average) encoding bit rate $br_{i,j}$ (therefore, different segments have a different size, expressed in number of bits, one from the other). A list of chunks $ck_i$, segments $seg_{i,j}$ and their location inside the server 110 (e.g., expressed by means of respective URLs), bit rates $br_{i,j}$, and possibly other parameters associated with the multimedia content (such as starting time and duration of the segment, resolution, codec name, and so on) are organized according to a so-called Media Presentation Description (MPD) file (referred to the multimedia content MC) stored into the server 110.

In order to enjoy a (desired) streaming service, i.e. the delivery of the (desired) multimedia content MC from the server 110 to the client 105, the client 105 has first to obtain the MPD file associated with the multimedia content MC. The MPD file can be delivered by the server 110 to the client 105 by using HTTP, e-mail, or by similar data transmission mechanisms. Once the client 105 has obtained the MPD file, the client 105 can send to the server 110 a request for receiving (i.e., downloading) segments $seg_{i,j}$ (of different chunks $ck_i$, generally from an initial chunk $ck_1$ to a last chunk $ck_1$) of the multimedia content MC. Moreover, during the download of the multimedia content MC, the client 105 may estimate an available bandwidth and request the most suitable segments $seg_{i,j}$ (in terms of number of bits) of each chunk $ck_i$ listed within the MPD.

According to the present invention, a rate control algorithm is implemented at the client 105. The rate control algorithm according to an embodiment of the invention has been designed to enable the client 105 for identifying the most suitable selection of the encoding bit rate of (chunks of) the multimedia content MC to be downloaded from the server 110, e.g., through the MPEG-DASH standard. The rate control algorithm advantageously exploits a cross-layer approach in which entities of multiple levels of the OSI protocol stack layer of the wireless communication network 100 interact with one another in order to identify the most suitable selection of segments $seg_{i,j}$ of each chunk $ck_i$ of the multimedia content MC to be provided by the server 110 to the client 105.

Figure 2:
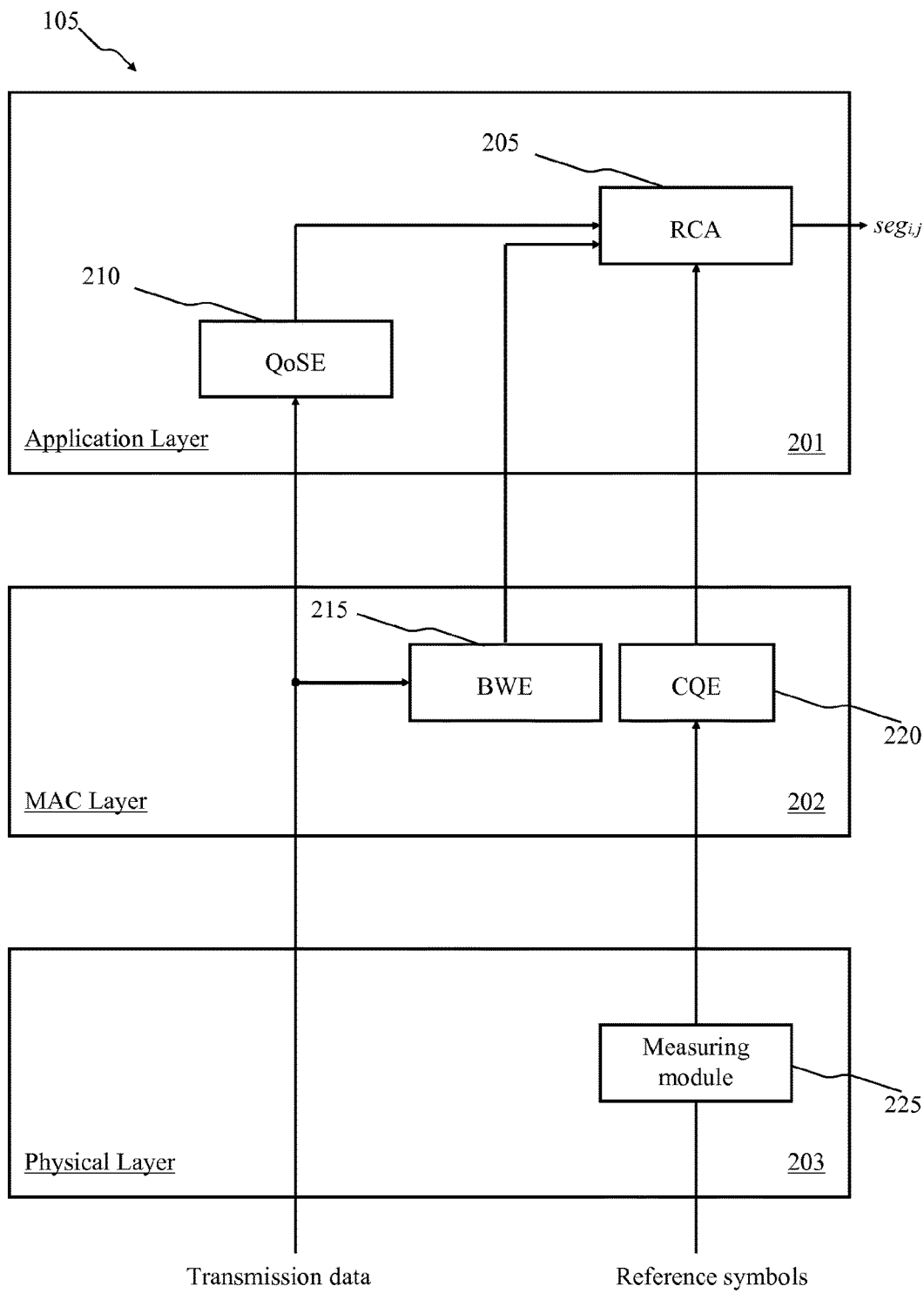
FIG. 2 is a simplified functional block schematic of protocol stack layers over which the rate control algorithm according to an embodiment of the present invention operates.

Turning now to FIG. 2, it is a simplified functional block schematic of OSI protocol stack layers over which the rate control algorithm according to an embodiment of the present invention operates.

In an embodiment of the invention, the rate control algorithm is implemented within a Rate Control Algorithm (RCA) functional module or entity 205 that is an entity provided at the application layer 201 of the OSI protocol stack. The RCA 205 is configured for dynamically selecting the segments $seg_{i,j}$ that the client 105 will request to the server 110, by considering information received from other entities of the protocols stack to which the RCA 205 is coupled.

In an embodiment of the invention, the RCA 205 interacts with a Quality of Service (QoS) Estimator functional module or entity 210 that is an entity provided at the application layer 201 as well. The RCA 205 further interacts with a Bandwidth Estimator functional module or entity 215 that is an entity provided at a data link layer, preferably in the Media Access Control (MAC) layer 202 (within the data link layer), of the OSI protocols stack. Finally, RCA 205 further interacts with a Channel Quality Estimator functional module or entity 220 that is an entity provided at the MAC layer 202 of the OSI protocol stack. The Channel Quality Estimator module 220 receives and exploits measures (described in the following) performed by a measuring module or entity 225 provided at the physical layer 203.

In more detail, the QoS Estimator 210 is configured to measure the quality of the streaming service based on transmission data, particularly the quality of the provision of the multimedia content MC to the client 105, expressed in terms of packet loss rate at the application layer 201. For example, for each segment $seg_{i,j}$ received by the client 105, the QoS Estimator 210 measures a packet loss rate $PLR(t_r)$, wherein $t_r$ is an iteration time instant (and $1 \le r \le R$, wherein R is a positive integer) at which an iteration of the rate control algorithm (as described in the following) starts, and estimates the moving average of the packet loss rate $E_{PLR}(t_r)$ as:

$$E_{PLR}(t_r) = \gamma \times E_{PLR}(t_{r-1}) + (1-\gamma) \times PLR(t_r), \quad (1)$$

wherein $\gamma$ is a smoothing constant, a positive number smaller than 1, preferably like 0.8, used to compute the moving average of the considered parameter.

The packet loss rate moving average $E_{PLR}(t_r)$ thus computed is then reported by the QoS Estimator 210 to the RCA 205.

The Bandwidth Estimator 215 is configured to measure an amount of bandwidth $R_{RX}(t_r)$ (e.g., in terms of bits per second, bps) assigned for the transmission to the client 105 by the wireless communication network 100 (e.g., by the radio communication station 115 of the wireless communication network 100 serving the client 105) in a given time interval (as described in the following). The Bandwidth Estimator 215 provides the measured assigned bandwidth $R_{RX}(t_r)$ to the RCA 205. For example, during a time interval $|t_r, t_{r+1}|$—i.e., between two consecutive iterations of the rate control algorithm starting at the iteration time instant $t_r$ and at a next iteration time instant $t_{r+1}$, respectively—the Bandwidth Estimator 215 measures the amount of measured assigned bandwidth $R_{RX}(t_r)$ assigned by the radio communication station 115, expressed in terms of bit/s, and then reports the measured assigned bandwidth $R_{RX}(t_r)$ to the RCA 205.

The Channel Quality Estimator 220 is configured to determine the channel quality (e.g. expressed in terms of maximum physical data rate achievable by using the single resource block) experienced by the client 105 exploiting the measurements that are performed by the measuring module 225 at the physical layer level 203 and to evaluate the corresponding allowable physical data rate, corresponding to the measured channel quality. For example, in case the wireless communication network 100 is a mobile telephony network, according to 3GPP LTE/LTE-A specifications, each mobile terminal is able to estimate a downlink channel quality in each Transmission Time Interval (TTI)—i.e. the smallest unit of time in which the wireless communication network 100 is capable of scheduling an UE, e.g. the client 105, for uplink (i.e., transmissions from the client 105 to the radio communication station 115) or downlink (i.e., transmission from the radio communication station 115 to the client 105) transmission.

In an embodiment of the present invention, the Channel Quality Estimator 220 exploits a measure (performed by the measuring module 225 at the physical layer level 203) of the SINR (Signal to Interference plus Noise Ratio) of specific reference symbols sent by the radio communication station 115 to the client 105. The computed SINRs are then mapped into Channel Quality Information CQI values that the UE reports to the radio communication station 115. For example, the measuring module 225 measures the SINR for each resource block (i.e., a fixed set of communication resources elements allocated to a UE, such as the client 105, during a TTI) and evaluates, through the Exponential Effective SINR Mapping (EESM) formula, the effective SINR. Then, Block Error Rate (BLER) curves available at the Channel Quality Estimator 220 are used to map each effective SINR into one respective CQI value.

Afterwards, the Channel Quality Estimator 220 computes, on the basis of the CQI values just determined, a maximum instantaneous physical data rate dmax($t_{TTI}$) (where $t_{TTI}$ is the time instant of the corresponding TTI) and a moving average of the physical data rate Dmax($t_{TTI}$), respectively, that the client 105 is able to reach in downlink transmission. For example, the Table 7.2.3-1 reported into the 3GPP TS 36.213 specification may be used to convert the obtained CQI value into a corresponding spectral efficiency value.

TABLE 7.2.3-1

4-bit CQI Table

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The maximum instantaneous physical data rate dmax ($t_{TTI}$) is then computed by using the following expression:

$$d\max(t_{TTI}) = \text{efficiency} \times n\text{RE} \times 0.9 \times \text{OH}, \quad (2)$$

where nRE is a number n of resource elements RE that are dedicated to transmission of data (e.g., data building up the segments $\text{seg}_{i,j}$) within the considered resource block, OH is a value lower than unity (i.e. OH<1) that takes into account an overhead due to control headers added to each packet at the different layers in the OSI protocol stack, the factor 0.9 takes into account the retransmissions of the H-ARQ protocol, which working point is typically set for a Block Error Rate (BLER) of 10% after the first transmission and efficiency is the value taken from the Table 7.2.3-1 of 3GPP TS 36.213.

Once the instantaneous physical data rate dmax($t_{TTI}$) has been computed, the client 105 is able to compute the moving average Dmax($t_{TTI}$) of the instantaneous physical data rate through the following equation:

$$D\max(t_{TTI}) = \beta \times D\max(t_{TTI-1}) + (1-\beta) \times d\max(t_{TTI}), \quad (3)$$

wherein γ is a smoothing constant (a number between 0 and 1, preferably set to 0.8) used to compute the moving average of the considered parameter.

The moving average of the physical data rate Dmax($t_{TTI}$) is then reported by the Channel Quality Estimator 220 to the RCA 205 every TTI.

Figure 3:
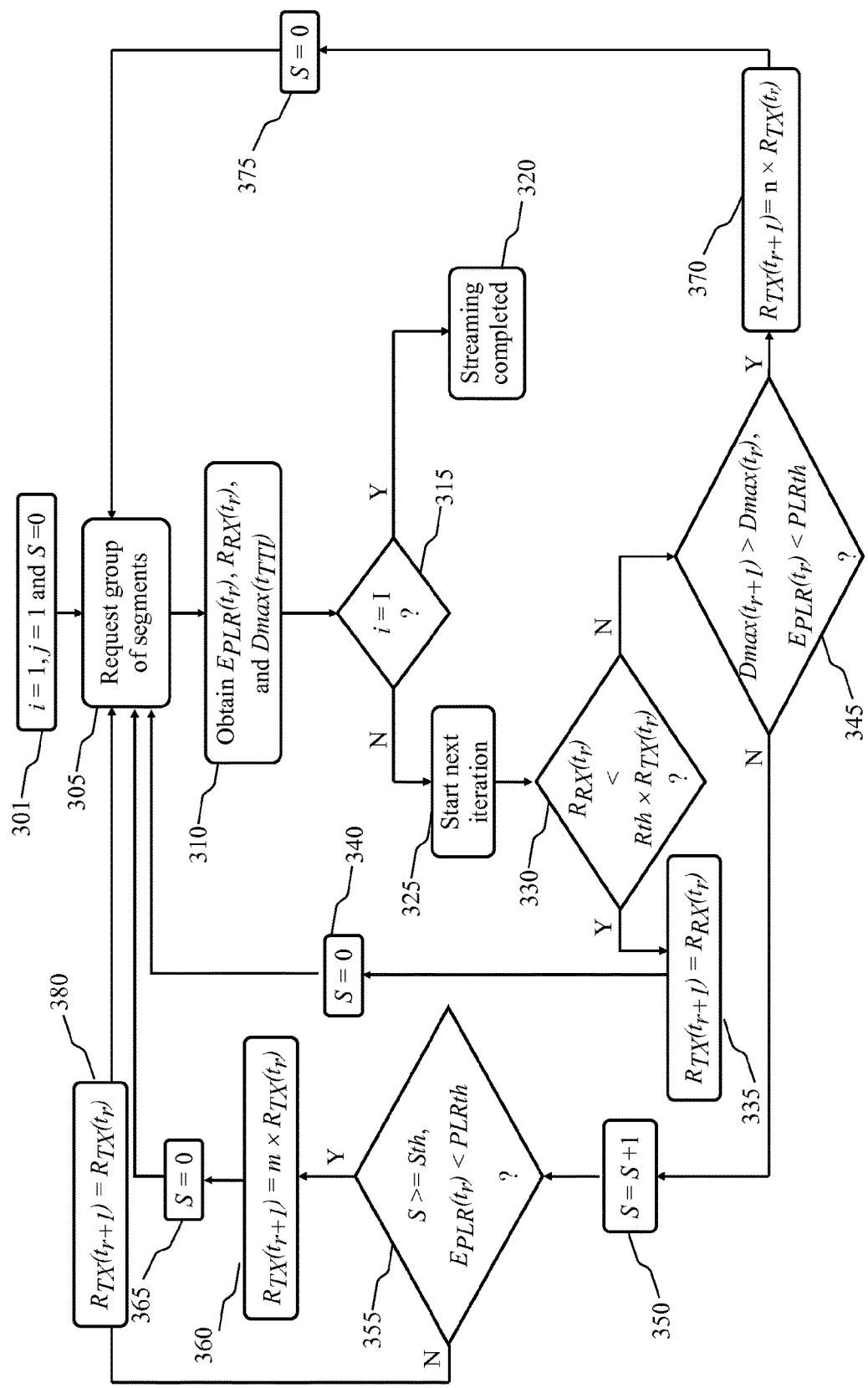
FIG. 3 is a simplified flowchart of the rate control algorithm according to an embodiment of the present invention.

Turning to FIG. 3, it is a simplified flowchart of the rate control algorithm according to an embodiment of the present invention.

On the basis of the information received by the QoS Estimator 210, the Bandwidth Estimator 215 and the Channel Quality Estimator 220, the RCA 205 determines an allowable encoding bit rate $R_{TX}(t_r)$ of the segments $\text{seg}_{i,j}$ to be downloaded from the server 110 by the client 105 starting from the iteration time instant $t_r$. In particular, the allowable encoding bit rate $R_{TX}(t_r)$ corresponds to a maximum encoding quality (i.e., the encoding bit rate $br_{i,j}$) of segments $\text{seg}_{i,j}$ that can be downloaded by the client 105 from the server 110 through the wireless communication network 100 during the iteration time instant $t_r$ (according to a quantity of resources, such as resource elements, assigned for the transmission of the multimedia content MC by the wireless communication network 100).

In one embodiment of the present invention the download of the segments $\text{seg}_{i,j}$ and the selection of the allowable encoding bit rate $R_{TX}(t_r)$ are preferably executed at different time instants, with different periodicities. In detail, segments $\text{seg}_{i,j}$ are requested by the client 105 every time interval (i.e., with a first periodicity) corresponding to the segment time duration Ts (substantially equal for the segments $\text{seg}_{i,j}$ of a same chunk $ck_i$, and therefore may be considered the time duration for the chunk $ck_i$), whereas the client 105 preferably calculates the proper allowable encoding bit rate $R_{TX}(t_r)$ of the next chunks of multimedia content MC to be downloaded from the server 110 every time interval (i.e., with a second periodicity) corresponding to the playout delay Tp (this being a time delay from the beginning of the download of the multimedia content sufficiently long to ensure that a sufficient amount of data has been transferred from the server 110 to the client 105 before the latter starts playing the content; the playout delay Tp is preferably substantially higher, e.g. 3 times or more, than the segment time duration Ts in order to avoid interruptions during the fruition of the multimedia content MC). For example, each playout delay Tp comprises a plurality of segment time durations Ts, or:

$$Tp = M \times Ts, \quad (4)$$

wherein M is a positive integer, e.g. equal to 3 or more, and thus each playout delay Tp is an integer multiple of segment time durations Ts.

Moreover, for example in case of a video-type multimedia content MC, the playout delay Tp is the sum of M segment time durations Ts, and in its turn each segment time duration Ts is the sum of a plurality of temporal lengths Tg representing the time duration of one Group of Pictures (GOP) of the multimedia content MC (i.e., Ts=L×Tg, where L is a positive integer). A GOP is composed by one frame I and a certain number of frames P and B. The I frame is encoded by using intra-frame techniques, which means that the compression is handled by considering only information related to that specific I frame. At the client 105 side, the decoding of an I frame does not require the knowledge of any additional frame. P and B frames are instead encoded by using inter-frame techniques, which means that the compression is done considering information associated with that specific P or B frame and other P and B frames that belong to the GOP. In particular, a P frame is encoded by considering previous frames; a B frame is encoded by considering both previous and next frames. For both P and B frames, in order to perform the decoding process, it is needed to receive all the frames considered during the encoding procedure.

Thus, in an embodiment of the present invention, a number M of consecutive segments $\text{seg}_{i,j}$ (group $g_r$ of segments) selected for being downloaded from the server 110 have a same allowable encoding bit rate $R_{TX}(t_r)$. This ensures a better perceived quality, or Quality of Experience (QoE), of the multimedia content MC by the end user that enjoys the multimedia content MC through the client 105. In facts, switching more often the allowable encoding bit rate $R_{TX}(t_r)$ leads to consecutive segments $\text{seg}_{i,j}$ with (generally)

different encoding bit rates $br_{i,j}$ which could be perceived by the end user as an overall unstable and/or corrupted multimedia content MC.

Back to FIG. 3, initially (block 301), variables i and j are initialized, e.g. to unity (i.e., i=j=1) and a counter S is initialized to zero (S=0).

Then (block 305), a group $g_r$ of M segments $seg_{i,j}$ of the multimedia content MC is requested by the client 105 to the server 110.

Preferably, at an initial iteration time $t_1$, the client 105 arbitrarily selects the group $g_1$ of M segments $seg_{i,j}$ (i.e., from a first segment $seg_{1,j}$ to a M-th segment $seg_{M,j}$) having an initial allowable encoding bit rate $R_{TX}(t_1)$ of the corresponding M initial chunks $ck_i$ of the multimedia content MC. For example, according to the MPEG-DASH standard, initially the client 105 selects the first group $g_1$ of M segments $seg_{i,j}$ that have been encoded with the lowest average encoding bit rate $br_{i,j}$ (procedure considered to be a conservative approach).

Then (block 310), the QoS Estimator 210 and the Bandwidth Estimator 215, measure and provide the moving average of the packet loss rate $E_{PLR}(t_r)$, the measured assigned bandwidth $R_{RX}(t_r)$, respectively, to the RCA 205, while the Channel Quality Estimator 220 provides the moving average $Dmax(t_{TTI})$ of the maximum instantaneous physical data rate to the RCA 205 (as described above).

Subsequently (block 315), the rate control algorithm checks whether the lastly downloaded chunk $ck_1$ of the segments group $g_r$ just downloaded was the last chunk $ck_1$ (i.e., i=I) of the whole multimedia content MC. In the affirmative case (exit branch Y of decision block 315) the multimedia content MC has been completely received by the client 105 and the rate control algorithm ends (block 320).

In the negative case (exit branch N of decision block 315), the rate control algorithm starts a next iteration (block 325) at the time instant $t_{r+1}$ in order to compute the next allowable encoding bit rate $R_{TX}(t_{r+1})$ for the next group $g_{r+1}$ of M segments $seg_{i,j}$.

The rate control algorithm checks (decision block 330) whether the (previously) measured assigned bandwidth $R_{RX}(t_r)$ is lower than the (previously selected) allowable encoding bit rate $R_{TX}(t_r)$ of the group $g_r$ of segments $seg_{i,j}$, preferably weighted by a rate threshold Rth (e.g., Rth=95%), or:

$$R_{RX}(t_r) < Rth \times R_{TX}(t_r). \quad (5)$$

The rate threshold Rth may be dimensioned on the basis of a variability of actual encoding bit rates of segments $seg_{i,j}$ with respect to the (average) encoding bit rates $br_{i,j}$ thereof.

Indeed, the actual encoding bit rates of segments $seg_{i,j}$ of different chunks $ck_i$ having a same (average) encoding bit rate $br_{i,j}$ typically turns out to differ one from the other in terms of (bit) size, due to differences among the (bit) sizes of the I, P and B frames that build up each segments $seg_{i,j}$ of different chunks $ck_i$.

Considering the variability of the encoding data rate of a video content, Rth can be also dimensioned by considering the variance of the encoding rate associated to a set of segments $seg_{i,j}$ encoded with the same coding rate.

In particular, a probability distribution for the actual encoding bit rates of segments $seg_{i,j}$ of different chunks $ck_i$ having the same (nominal) encoding bit rate $br_{i,j}$ may be built, and the rate threshold Rth may be based on a variance of such a probability distribution.

In other words, the rate control algorithm checks if the measured assigned bandwidth $R_{RX}(t_r)$ possibly allows selecting the segments $seg_{i,j}$ of the next segments group $g_{r+1}$ with a higher quality (i.e., higher encoding bit rate $br_{i,j}$) with respect to the previous group $g_r$ of segments $seg_{i,j}$.

When condition (5) is met (exit branch Y of decision block 330), the encoding bit rate $br_{i,j}$ of the previous group $g_r$ of segments $seg_{i,j}$ is the maximum encoding bit rate $br_{i,j}$ that can be handled at the measured assigned bandwidth $R_{RX}(t_r)$ and, therefore, the next allowable encoding bit rate $R_{TX}(t_{r+1})$ for the next group $g_{r+1}$ of segments $seg_{i,j}$ is set (block 335) equal to the (previously) measured assigned bandwidth $R_{RX}(t_r)$, i.e.:

$$R_{TX}(t_{r+1}) = R_{RX}(t_r) \quad (6)$$

Once the allowable encoding bit rate $R_{TX}(t_{r+1})$ has been computed through Eq. (9), the client selects the most suitable video segment, among those available at the server side, whose data rate is equal to or immediately less than the aforecomputed value.

Afterwards, the counter S is reset (i.e., S=0; block 340) and operation returns to block 305 for selecting the next group $g_{r+1}$ of segments $seg_{i,j}$ having the next allowable encoding bit rate $R_{TX}(t_{r+1})$ determined by means of equation (6).

Back to decision block 330, if the inequality $R_{RX}(t_r) < Rth \times R_{TX}(t_r)$ is not verified (exit branch N of decision block 330), the rate control algorithm further checks (decision block 345) whether the next moving average of the physical data rate $Dmax(t_{r+1})$ (i.e., $t_{TTI} = t_{r+1}$) is greater than the (previously calculated) moving average of the physical data rate $Dmax(t_r)$ (i.e., $t_{TTI} = t_r$) and if the (previous) packet loss rate moving average $E_{PLR}(t_r)$ is lower than the packet loss rate threshold PLRth (PLRth can be properly tuned in order to implement an algorithm that does not involve instabilities and/or oscillations, i.e., quick and periodic changes of the quality of the streaming service between a lower and an higher value), or:

$$D\max(t_{r+1}) > D\max(t_r), \text{ and} \quad (7)$$

$$E_{PLR}(t_r) < \text{PLRth} \quad (8)$$

In other words, it is verified if the quality of the communication between the client 105 and the server 110 allows selecting a next group $g_{r+1}$ of segments $seg_{i,j}$ having the next allowable encoding bit rate $R_{TX}(t_{r+1})$ greater than the allowable encoding bit rate $R_{TX}(t_r)$ of the (previously downloaded) group $g_r$ of segments $seg_{i,j}$.

In the affirmative case (exit branch Y of decision block 345), it is possible to increase the next allowable encoding bit rate $R_{TX}(t_{r+1})$ with respect to the (previous) allowable encoding bit rate $R_{TX}(t_r)$. Preferably, the next allowable encoding bit rate $R_{TX}(t_{r+1})$ may be determined (block 370) by multiplying the (previous) allowable encoding bit rate $R_{TX}(t_r)$ by the ratio n of the next moving average of the physical data rate $Dmax(t_{r+1})$ and the moving average of the physical data rate $Dmax(t_r)$, or:

$$R_{TX}(t_{r+1}) = n \times R_{TX}(t_r) = \frac{D\max(t_{r+1})}{D\max(t_r)} \times R_{TX}(t_r). \quad (9)$$

Once the allowable encoding bit rate $R_{TX}(t_{r+1})$ has been computed through Eq. (9), the client selects the most suitable video segment, among those available at the server side, whose data rate is equal to or immediately less than the aforecomputed value.

Afterwards, the counter S is reset (i.e., S=0; block 375) and operation returns to block 305 for selecting the next group $g_{r+1}$ of segments $seg_{i,j}$ having the next allowable encoding bit rate $R_{TX}(t_{r+1})$ determined by means of equation (9).

Preferably, although not limitatively, the rate control algorithm may be configured for performing a probing procedure for exploring the possibility of selecting the next group $g_{r+1}$ of segments $seg_{i,j}$ with an increased bit rate even after both decision block 330 and decision block 345 return a negative check, instead of simply setting the next allowable encoding bit rate $R_{TX}(t_{r+1})$ for the next group $g_{r+1}$ of segments $seg_{i,j}$ equal to the (previously) measured assigned bandwidth $R_{RX}(t_r)$ (i.e., similarly to block 335).

According to an embodiment of the probing procedure, once the check on the decision block 345 is not verified (exit branch N of decision block 345), the counter S is increased (i.e., S=S+1; block 350). The counter S counts the number of iterations of the rate control algorithm for which the next allowable encoding bit rate $R_{TX}(t_{r+1})$ has not been modified (either incremented, neither decremented).

Then, the rate control algorithm checks (decision block 355) whether the counter S is equal to or higher than an iteration threshold Sth (i.e., a certain number Sth of subsequent groups $g_r$ of segments $seg_{i,j}$ have been selected with the same encoding rate, such as Sth=1 or 2) and whether the packet loss rate moving average $E_{PLR}(t_r)$ is lower than a packet loss rate threshold PLRth, i.e.:

$$S \leq Sth, \text{ and} \quad (10)$$

$$E_{PLR}(t_r) < PLRth \quad (11)$$

In the negative case (exit branch N of decision block 355), the algorithm decides not to select the next group $g_{r+1}$ of segments $seg_{i,j}$ with an increased bit rate with respect to the next allowable encoding bit rate, the next encoding bit rate $R_{TX}(t_{r+1})$ is set (step 380) equal to the encoding bit rate $R_{TX}(t_r)$, determined by means of equation (12):

$$R_{TX}(t_{r+1}) = R_{TX}(t_r) \quad (12)$$

and the operations return to block 305 for selecting the next group $g_{r+1}$ of segments $seg_{i,j}$.

In the affirmative case (exit branch Y of the decision block 355), the next allowable encoding bit rate $R_{TX}(t_{r+1})$ for the next group $g_{r+1}$ of segments $seg_{i,j}$ is set (block 360) greater than the allowable encoding bit rate $R_{TX}(t_r)$ selected at the previous iteration, by using equation (13), i.e.:

$$R_{TX}(t_{r+1}) = m \times R_{TX}(t_r) \quad (13)$$

wherein m (with m>1) is a multiplicative factor designed for increasing the next allowable encoding bit rate $R_{TX}(t_{r+1})$ by one step (i.e., since the multimedia server 110 stores, for each video chunk $c_j$ a set of segments $seg_{i,j}$ encoded with different encoding data rates, this enable the user 105 to select the group of video segment $seg_{i,j}$ whose encoding data rate is immediately higher than the one select at the previous iteration of the algorithm).

Then, the counter S is reset (i.e., S=0; block 365) and the operation returns to block 305 for selecting the next group $g_{r+1}$ of segments $seg_{i,j}$ having the next allowable encoding bit rate $R_{TX}(t_{r+1})$ determined by means of equation (13).

Thanks to the rate control algorithm according to an embodiment of the present invention it is possible for a user to enjoy a multimedia content MC provided by the server 110 to the client 105 through the wireless communication network 100 (substantially) constantly and completely automatically at the best encoding bit rate $br_{i,j}$ allowed by the wireless communication network 100 at the same time avoiding lags or interruptions during a playback of the multimedia content MC and ensure a good Quality of Experience perceived by the end-user.

The invention claimed is:

1. A method of downloading a multimedia content from a server to a client device through a wireless communication network, the multimedia content being subdivided into a plurality of portions and for each portion the server storing a plurality of versions thereof each of which is encoded with a specific encoding quality, the method comprising:
   selecting, by the client device and among the plurality of versions of each portion of the multimedia content, a version of the portion of the multimedia content to be downloaded based on wireless communication parameters determined at at least two different layers of a wireless communication network OSI protocol stack at the client device, wherein the wireless communication parameters determined at the at least two different layers of the wireless communication network OSI protocol stack at the client device comprise first wireless communication parameters determined at an application layer of the OSI protocol stack, and wherein the first wireless communication parameters comprise a streaming service quality of the download of the multimedia content from the server to the client device determined at the application layer of the OSI protocol stack.

2. The method according to claim 1, wherein each portion of the multimedia content has a respective time duration and wherein the step of selecting a version among the plurality of versions of each portion of the multimedia content is iterated with a periodicity longer than the time duration of each portion of the multimedia content.

3. The method according to claim 2, wherein the periodicity is an integer multiple of the time duration of each portion of the multimedia content.

4. The method according to claim 2, wherein the step of selecting a version among the plurality of versions of each portion of the multimedia content comprises:
   selecting versions having a same specific encoding quality for a number of consecutive portions of the multimedia content to be downloaded.

5. The method according to claim 4, wherein the periodicity is equal to sum of the time durations of the number of consecutive portions of the multimedia content.

6. The method according to claim 2, wherein the step of selecting a version among the plurality of versions of each portion of the multimedia content comprises:
   selecting versions having the lowest encoding quality among the plurality of versions of each portion of the multimedia content in a first iteration of the step of selecting a version among the plurality of versions of each portion of the multimedia content.

7. The method according to claim 1, wherein the wireless communication parameters determined at the at least two different layers of the wireless communication network OSI protocol stack at the client device comprise: second wireless communication parameters determined at a level of a data link layer of the OSI protocol stack and third wireless communication parameters determined at the level of the data link layer based on measurements performed at a level of a physical layer of the OSI protocol stack.

8. The method according to claim 7, wherein:
   the second wireless communication parameters comprise:
     a measured assigned bandwidth assigned for downloading the multimedia content from the server to the client device by the wireless communication network determined at the data link layer of the OSI protocol stack, and the third wireless communication parameters comprise:
an allowable physical data rate for the download of the multimedia content from the server to the client device based on a transmission channel quality determined at the data link layer of the OSI protocol stack based on the measurements performed at the level of the physical layer of the OSI protocol stack.

9. The method of claim 8, wherein each portion of the multimedia content has a respective time duration and wherein the step of selecting a version among the plurality of versions of each portion of the multimedia content is iterated with a periodicity longer than the time duration of each portion of the multimedia content, and wherein each iteration of the step of selecting a version among the plurality of versions of each portion of the multimedia content comprises obtaining the wireless communication parameters at least once.

10. The method according to claim 9, wherein each iteration of the step of selecting a version among the plurality of versions of each portion of the multimedia content further comprises steps of:

a) checking whether the measured assigned bandwidth is lower than an allowable encoding bit rate selected for the versions downloaded from the server by the client device during a previous iteration of the step of selecting a version among the plurality of versions of each portion of the multimedia content, and if the measured assigned bandwidth is lower than the allowable encoding bit rate:

b) setting a next allowable encoding bit rate for next versions to be downloaded from the server by the client device equal to the measured assigned bandwidth during a current iteration of the step of selecting a version among the plurality of versions of each portion of the multimedia content, or else, if the measured assigned bandwidth is greater than or equal to the allowable encoding bit rate:

c) verifying whether a quality of a communication between the client device and the server allows the next allowable encoding bit rate to be greater than the allowable encoding bit rate on the basis of the streaming service quality and the allowable physical data rate, and in an affirmative case:

d) increasing the next allowable encoding bit rate with respect to the allowable encoding bit rate, or in a negative case:

e) checking whether a quality of the communication between the client device and the server allows the next allowable encoding bit rate to be greater than the allowable encoding bit rate on the basis of the streaming service quality and whether during a predetermined number of previous iterations of the step of selecting a version among the plurality of versions of each portion of the multimedia content, the allowable encoding bit rate has been set equal to the measured assigned bandwidth, and in an affirmative case:

f) increasing the next allowable encoding bit rate to a value higher than the allowable encoding bit rate of the predetermined number of previous iterations of the step of selecting a version among the plurality of versions of each portion of the multimedia content, or in a negative case:

g) setting a next allowable encoding bit rate for next versions to be downloaded from the server by the client device equal to the allowable encoding bit rate during the current iteration of the step of selecting a version among the plurality of versions of each portion of the multimedia content.

11. The method according to claim 10, wherein the step a) of checking whether the measured assigned bandwidth is lower than an allowable encoding bit rate comprises:

weighting the allowable encoding bit rate by a rate threshold.

12. The method according to claim 11, wherein the step e) of checking whether a quality of the communication between the client device and the server allows the next allowable encoding bit rate to be greater than the allowable encoding bit rate on the basis of the streaming service quality and whether during a predetermined number of previous iterations the step of selecting a version among the plurality of versions of each portion of the multimedia content the allowable encoding bit rate has been set equal to the measured assigned bandwidth comprises:

checking whether the streaming service quality is lower than a streaming service quality threshold.

13. The method according to claim 11, wherein the step f) of increasing the allowable encoding bit rate to a value higher than the measured assigned bandwidth of the predetermined number of previous iterations comprises:

setting the next allowable encoding bit rate to a value corresponding to the allowable encoding bit rate multiplied by a multiplicative factor.

14. The method according to claim 10, wherein the step c) of verifying whether the quality of the communication between the client device and the server allows the next allowable encoding bit rate to be greater than the allowable encoding bit rate comprises:

checking whether the next allowable physical data rate of the versions of the portions of the multimedia content to be downloaded is greater than the allowable physical data rate of the downloaded versions of the portions of the multimedia content.

15. The method according to claim 14, wherein the step c) of verifying whether the quality of the communication between the client device and the server allows the next allowable encoding bit rate to be greater than the allowable encoding bit rate further comprises:

checking whether the streaming service quality is lower than a streaming service quality threshold.

16. The method according to claim 10, wherein the step d) of increasing the next allowable encoding bit rate with respect to the allowable encoding bit rate comprises:

setting the next allowable encoding bit rate to a value corresponding to the allowable encoding bit rate multiplied by a ratio of the next allowable physical data rate and the allowable physical data rate.

17. The method according to claim 8, wherein the streaming service quality comprises a packet loss rate moving average determined as:

$$E_{PLR}(t_r) = \gamma \times E_{PLR}(t_{r-1}) + (1-\gamma) \times PLR(t_r),$$

wherein $E_{PLR}(t_r)$ is a packet loss rate moving average for a current iteration, $E_{PLR}(t_{r-1})$ is a packet loss rate moving average determined at a previous iteration, $PLR(t_r)$ is a packet loss rate for the current iteration and $\gamma$ is a smoothing constant used to compute the moving average of a considered parameter.

18. The method according to claim 8, wherein the allowable physical data rate comprises:

a maximum instantaneous physical data rate computed as:

$$d\max(t_{TTI}) = \text{efficiency} \times n\text{RE} \times 0.9 \times \text{OH},$$

wherein dmax($t_{TTI}$) is the maximum instantaneous physical data rate, nRE is a number n of resource elements RE dedicated to transmission of data referred to the versions of the portions of the multimedia content within a considered resource block, OH is an overhead due to the OSI protocol stack, 0.9 is a corrective factor, and efficiency is a value taken from Table 7.2.3-1 of 3GPP TS 36.213 on the basis of a measured SINR (Signal to Interference plus Noise Ratio) for the considered resource block.

19. The method according to claim 18, wherein the allowable physical data rate further comprises:

a moving average of a physical data rate computed as:

$$D\max(t_{TTI}) = \beta \times D\max(t_{TTI-1}) + (1-\beta) \times d\max(t_{TTI}),$$

wherein Dmax($t_{TTI}$) is the moving average of the physical data rate for a current iteration, Dmax($t_{TTI-1}$) is a moving average of the physical data rate for a previous iteration and β is a smoothing constant used to compute the moving average of a considered parameter.

20. A client device adapted to be coupled with a server through a wireless communication network for downloading multimedia content, the multimedia content being subdivided into a plurality of portions and for each portion the server storing a plurality of versions thereof each of which is encoded with a specific encoding quality, wherein the client device is configured to:

select, among the plurality of versions of each portion of the multimedia content, a version of the portion of the multimedia content to be downloaded based on wireless communication parameters determined at at least two different layers of a wireless communication network OSI protocol stack at the client device, wherein the wireless communication parameters determined at the at least two different layers of the wireless communication network OSI protocol stack at the client device comprise first wireless communication parameters determined at an application layer of the OSI protocol stack, and wherein the first wireless communication parameters comprise a streaming service quality of the download of the multimedia content from the server to the client device determined at the application layer of the OSI protocol stack.

* * * * *